No. 682,741. Patented Sept. 17, 1901.
J. PFLEGER.
METHOD OF MAKING CYANIDS.
(Application filed Dec. 10, 1900.)
(No Model.)
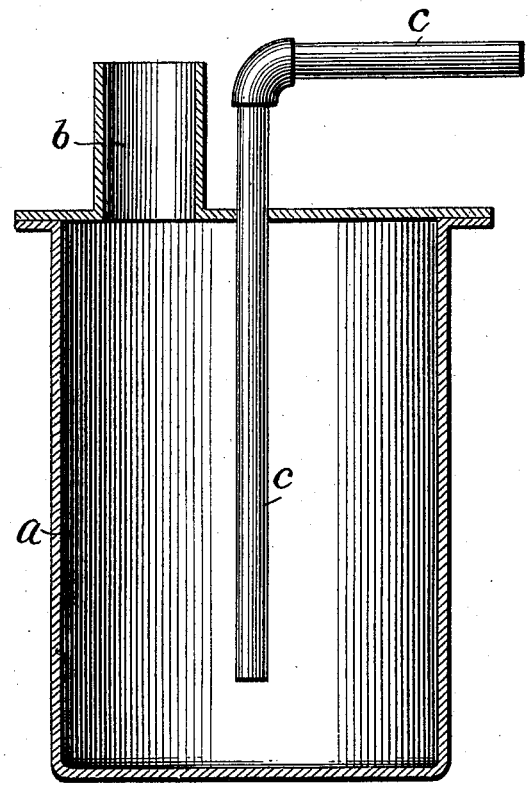

UNITED STATES PATENT OFFICE.

JOHANNES PFLEGER, OF FRANKFORT-ON-THE-MAIN, GERMANY, ASSIGNOR TO DEUTSCHE GOLD & SILBER-SCHEIDE-ANSTALT, VORM. ROESSLER, OF SAME PLACE.

METHOD OF MAKING CYANIDS.

SPECIFICATION forming part of Letters Patent No. 682,741, dated September 17, 1901.

Application filed December 10, 1900. Serial No. 39,382. (No specimens.)

*To all whom it may concern:*

Be it known that I, JOHANNES PFLEGER, a subject of the Emperor of Germany, and a resident of 215 Gutleutstrasse, Frankfort-on-the-Main, Germany, have invented certain new and useful Improvements in the Manufacture of Cyanids, of which the following is a specification.

In the United States Patent No. 543,643 it is stated that the synthesis of the cyanids from an alkali metal, ammonia, and carbon in one operation gives insufficient results, and the reason given for this is that the high temperature which is necessary to maintain for the formation of the cyanid is detrimental to the unchecked formation of the alkali amids. To render possible an unchecked synthesis of the cyanids with the aforesaid substances and to obtain a good yield, it is necessary according to the aforesaid specification to divide the process into two operations and to carry it out in two apparatuses. I have discovered that this is not necessary and that the synthesis by means of sodium, ammonia, and carbon can be carried out in a single apparatus and in one operation, if the conditions stated in the specification of my application, Serial No. 39,383, of even date herewith, for Letters Patent for the preparation of cyanamid and its compounds are observed. In the said specification is described a new process for preparation of dialkalicyanamids—such as, for instance, the disodium-cyanamid, ($Na_2NCN$.) Drechsel, (see the *Journal für Praktische Chemie*, (2,) 21, p. 90,) has found that dialkalicyanamid compounds can be converted into alkali cyanids by fusing them with carbon. For the synthetical production of cyanids according to this invention cyanamid is prepared, but in presence of as much carbon as will cause all the alkali cyanamid to be converted into cyanid.

The accompanying drawing shows a melting vessel in sectional elevation, in which my process may be carried out.

In the drawing, $a$ is the vessel, $b$ the charging-opening through which the gases escape, while $c$ is the tube through which the ammonia is let in.

This invention may be carried out as follows: In the melting vessel $a$, which may be built in a furnace capable of efficient regulation, the cyanid—for instance, sodium cyanid—is melted, and then the calculated quantity of alkali metal and carbon is added thereto. At a temperature that is just sufficient to keep the cyanid in a fluid state a current of ammonia of suitable strength is caused to pass through the mixture. About one hundred and fifty kilograms of potassium cyanid are melted. Then about seventy kilograms of charcoal and about one hundred kilograms of metallic sodium are added. Then ammonia is let in until all the metallic sodium has disappeared. The temperature of the molten mass should first be about 550° centigrade. During the process the temperature is successively raised until it is at the end of the operation about 800° centigrade. The duration of the process is from ten to twelve hours; but I do not confine my invention to these exact limits, as they may vary somewhat. The following reactions then take place: First, the metal and the ammonia unite to form an alkali amid, which in its nascent state combines at once with the cyanid to form a dialkalicyanamid, with which latter the carbon combines, so that a cyanid is formed. In order that the last-named reaction, the addition of carbon to the dialkalicyanamid, may take place quantitatively, the temperature of the reacting mixture must be raised a little toward the end of the operation.

The above-described reactions may be expressed by the following equations:

I. $Na + HN_3 = NaNH_2 + H$.

II. $NaNH_2 + NaCN = Na_2N_2C + H_2$.

III. $Na_2N_2C + C = 2NaCN$.

By combining Equations I and II the reactions may be expressed as follows:

I. $Na + NH_3 + NaCN = Na_2N_2C + 3H$.

II. $Na_2N_2C + C = 2NaCN$ in two equations.

The great advantage of this process resides, first of all, in the fact that the amid, which is easily decomposed at a high temperature, is, owing to its being at the moment of its formation absorbed by the previously-introduced cyanid and transformed into the much more stable cyanamid, protected by this very process against decomposition, and in consequence can be quantitatively converted into cyanid at the high temperature. Besides this advantage, the apparatus is of the simplest kind that can be imagined, and the whole process of formation of the cyanid by means of sodium, ammonia, and carbon is carried out in one single crucible, which was not possible when operating in accordance with the specification of the aforesaid patent. In lieu of sodium and sodium cyanid any other alkali metal and its cyanid may of course be used.

I claim—

The herein-described process for the production of alkali cyanids, which consists in reacting ammonia with a mixture of alakali metal, carbon and cyanid, at a temperature not substantially exceeding the melting-point of cyanid, thereby forming dialkalicyanamid, then raising the temperature of the mass to about 750° to 800° centigrade, thereby causing the dialkalicyanamid to combine with the carbon, forming alkali cyanid, substantially as and for the purposes set forth.

In testimony whereof I have signed my name to this specification in the presence of two subscribing witnesses.

JOHANNES PFLEGER.

Witnesses:
JEAN GRUND,
FRANZ HASSLACHER.